United States Patent [19]

Hill

[11] 3,996,878
[45] Dec. 14, 1976

[54] ASSEMBLY FOR INDICATING TRANSLATIONAL MOVEMENT OF A MEMBER SELECTIVELY IN ONE OF TWO SCALES

[75] Inventor: Stanley Hill, Colchester, England
[73] Assignee: Gamet Products Limited, England
[22] Filed: Oct. 17, 1975
[21] Appl. No.: 623,415

[30] Foreign Application Priority Data
Nov. 8, 1974 United Kingdom ............ 48559/74

[52] U.S. Cl. ...................... 116/115.5; 116/DIG. 47
[51] Int. Cl.² ......................................... B23Q 17/18
[58] Field of Search ................ 116/DIG. 47, 115.5, 116/115, 133

[56] References Cited
UNITED STATES PATENTS

| | | | |
|---|---|---|---|
| 3,418,965 | 12/1968 | Rabinow | 116/115.5 |
| 3,536,031 | 10/1970 | Sindall | 116/115.5 |
| 3,921,567 | 11/1975 | Wildhaber | 116/DIG. 47 |
| R26,527 | 2/1969 | Rabinow | 116/115.5 |

FOREIGN PATENTS OR APPLICATIONS

| | | | |
|---|---|---|---|
| 1,904,414 | 8/1970 | Germany | 116/DIG. 47 |

Primary Examiner—S. Clement Swisher
Assistant Examiner—Denis E. Corr
Attorney, Agent, or Firm—McCormick, Paulding & Huber

[57] ABSTRACT

An assembly for attachment to a rotatable shaft of a machine tool, for example, a lathe, for indicating translational movement of a member selectively in one of two scales, including two dials graduated one in each said scale, an idler pinion connecting the two dials, the number of teeth on each dial engaging the idler pinion giving the required conversion ratio, and an indexable sleeve surrounding both dials and being movable to reveal only a selected scale at any one time.

7 Claims, 3 Drawing Figures

ASSEMBLY FOR INDICATING TRANSLATIONAL MOVEMENT OF A MEMBER SELECTIVELY IN ONE OF TWO SCALES

This invention relates to an assembly for indicating translational movement of a member selectively in one of two scales, and in particular to an assembly designed for attachment to a machine tool, for example, a lathe for indicating movement of part thereof in either Imperial or metric units.

According to the present invention there is provided an assembly for indicating translational movement of a member selectively in one of two scales, including a subassembly adapted for mounting on a fixed structure, a first dial for mounting coaxially with and for rotation about a shaft, a second dial for mounting coaxially with and for rotation about said shaft, said first and second dials both having internal teeth in mesh with an idler pinion carried by said sub-assembly, said first and second dials also having a first and second set of graduations marked respectively on the external surfaces thereof as continuing scales (as herein defined), and an indexable sleeve surrounding both of said scales, said sleeve being rotatable about the axis of said shaft and having two openings therein through which the graduations may be observed and read against a datum line associated with each opening, said openings being positioned so that only one thereof is in view from a given direction at any one time to observe the respective scale, said first dial being connectable for rotation by said shaft and said second dial being rotated by rotation of said first dial through said idler pinion, the number of teeth on the first and second dials being such as to give the desired conversion ratio from one said scale to the other.

In a further feature of the invention, said first dial is in screw-threaded connection with a lock nut for zero setting purposes.

Conveniently, said sleeve has its openings disposed at 180° to each other about said shaft, and a detent mechanism is provided to retain the sleeve temporarily in its two locations.

The said detent mechanism may include two balls in the sub-assembly which engage selectively in two holes in an end plate integral with the sleeve and resilient means is provided to urge the plate against the balls. Conveniently, the resilient means is a Belleville spring.

In this Specification, by the expression a "continuing scale" is meant an endless scale in which the origin coincides and therefore forms a graduation for a major division some distance along the scale, thereby enabling all the divisions of the scale used for the first revolution of the said shaft to be used also for subsequent revolutions of the shaft.

In order to illustrate the invention one embodiment thereof will now be described, by way of example only, with reference to the accompanying drawing, in which.

Figure 1:
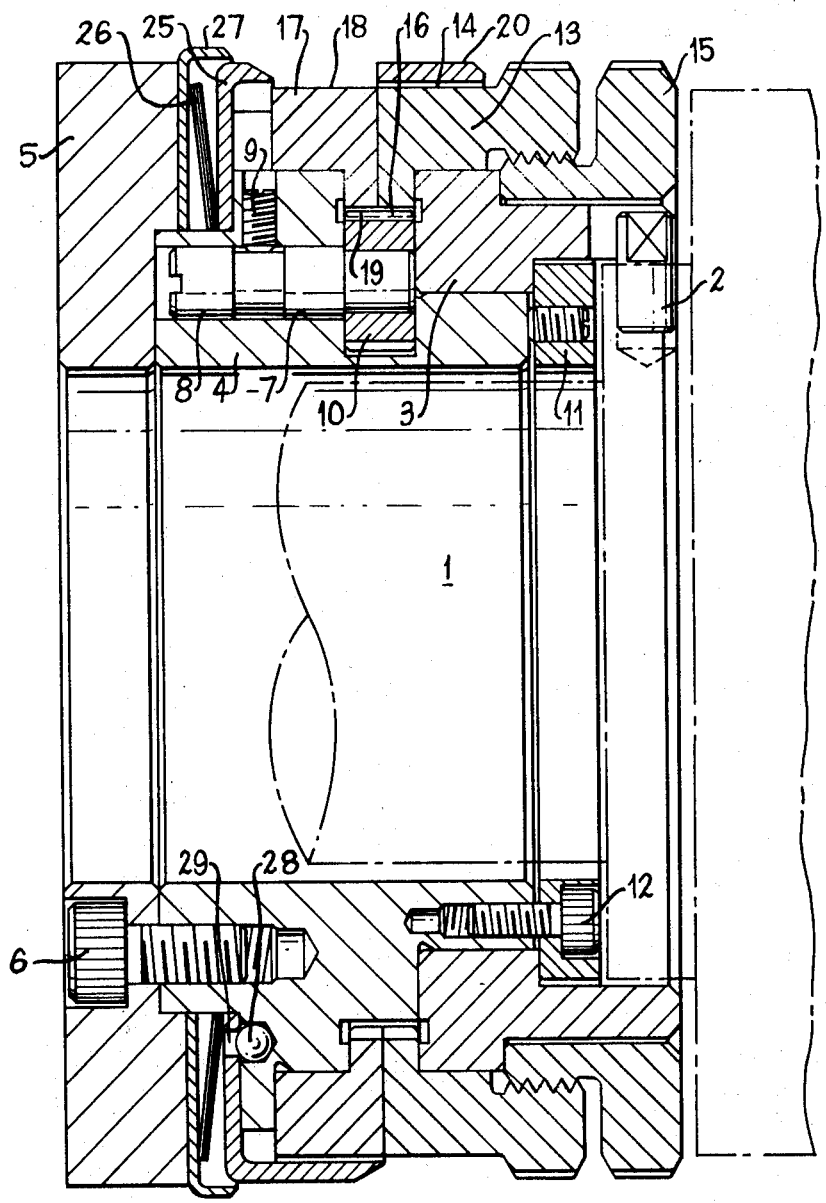
FIG. 1 is a longitudinal cross-sectional view through an assembly constructed in accordance with the invention.
Figure 2:
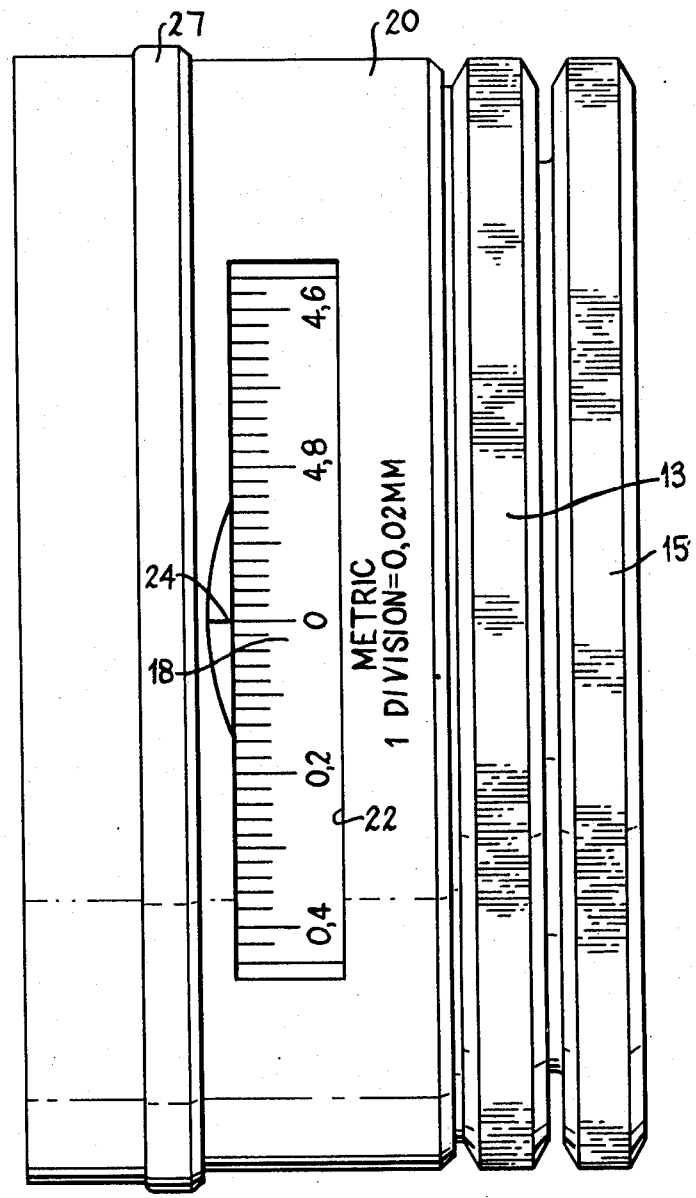
FIG. 2 is a side elevation of the assembly of FIG. 1 adjusted to read metric units.
Figure 3:
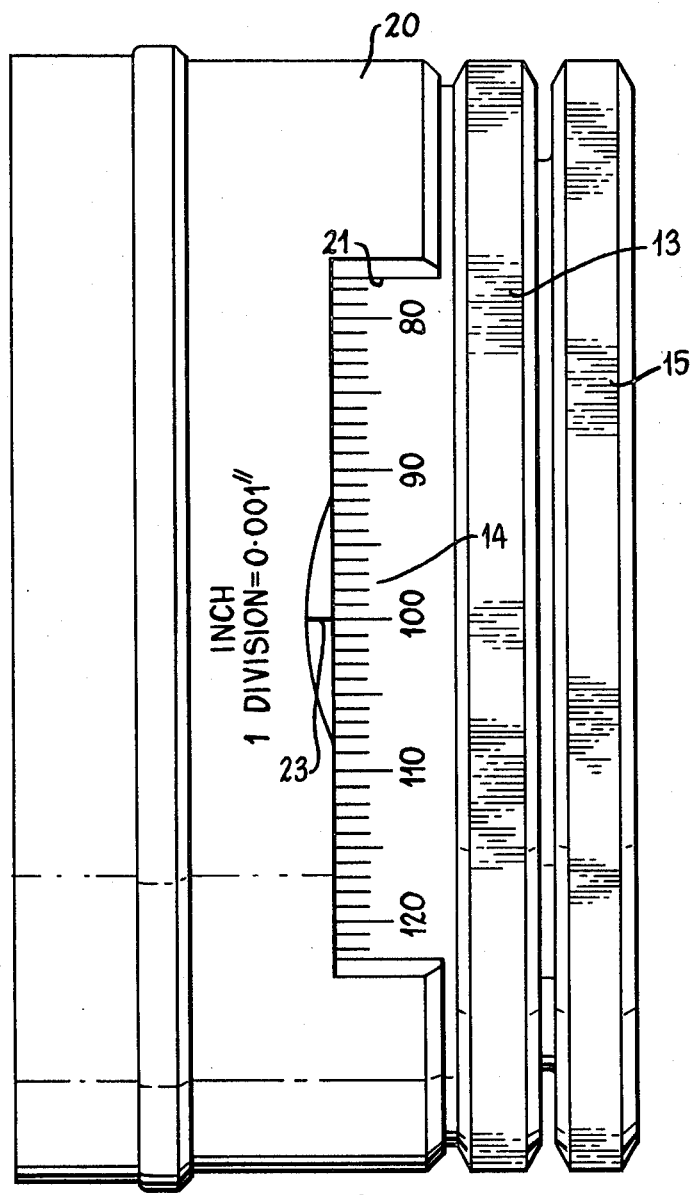
FIG. 3 is a side elevation of the assembly of FIG. 1 adjusted to read Imperial units.

In the drawing there is illustrated an assembly in accordance with the invention for attachment about a shaft 1 of a machine tool, for example, a lathe, for rotation by, for example, a hand-wheel (not shown). A pin 2 connects the shaft 1 to a ring 3 so that the ring 3 rotates with the shaft 1. This ring 3 rotates on a sub-assembly comprising an intermediate block 4 to which is fixed an end block 5 by bolts 6. The intermediate block 4 has a bore 7 therein, within which is located a spindle 8 held in position by a grub screw 9, the spindle 8 carrying an idler pinion 10. The sub-assembly 4,5 together with the idler pinion 10 is adapted for mounting on a fixed part of the structure, for example, the lathe, so as to be non-rotatable about the shaft 1.

The ring 3 is held on the intermediate block 4 by an abutment member 11 fixed to the intermediate block 4 by bolts 12.

Carried by the ring 3 is a first dial 13 having on its external surface 14 graduations which, in this instance, are in the Imperial scale of measurement. This first dial 13 is in screw-threaded connection with a lock nut 15 whereby on releasing the lock nut 15, the first dial 13 and the lock nut 15 may be rotated together about the ring 3 for zero setting purposes. On tightening the lock nut 15, the first dial 13 and the lock nut 15 are clamped securely to the ring 3 for rotation therewith. The first dial 13 is provided with internal teeth 16 permanently in mesh with the teeth of idler pinion 10.

Mounted for rotation about intermediate block 4 is a second dial 17 having graduations marked on the external surface 18 thereof, these graduations being in the metric scale of measurement. The second dial 17 is provided with internal teeth 19 also permanently in mesh with the teeth of idler pinion 10.

Disposed about the first and second dials is an indexable sleeve 20 having openings 21 and 22 therein through which openings the graduations may selectively be viewed. The opening 21 has a datum mark 23 against which the Imperial graduations may be read, and the opening 22 has a datum mark 24 against which the metric graduations may be read. These openings 21 and 22 are disposed at 180° to each other on the sleeve 20 so that when an operator of the machine tool is viewing the assembly, only one of the openings, and hence only one of the sets of graduations, will be visible at any one time.

The sleeve 20 is provided with an integral end plate 25 and a Belleville spring 26 located with a cowl 27 urges the end plate 25 against one face of the intermediate block 4 which carries two detent balls 28 (only one of which is shown in the drawing) which selectively engage in two holes 29 in the end plate 25. These holes 29 are disposed at 180° with respect to the axis of shaft 1.

In order to provide the necessary conversion ratio, the first dial 13 is provided with one hundred and twenty-seven gear teeth 16 and the second dial 17 is provided with 125 or 120 gear teeth 19, depending on whether the screw pitch involved is in multiples of 0.100 inches or 0.125 inches, respectively. The idler pinion 10 will be provided with an appropriate number of teeth so as to mesh with both the different numbers of gear teeth 16 and 19.

It will be appreciated that with an assembly constructed in accordance with the above this may be built in as part of a machine tool or may be an attachment to a machine tool whenever it is necessary readily to convert the movement of a member from Imperial to metric units, or vice versa. The assembly has the facility of giving the operator of the machine an opportunity of reading measurements selectively in either scale. This the operator does by indexing the sleeve 20, i.e. by rotating the sleeve about the axis of the shaft 1 through 180° from one detent to the other, thereby bringing the datum mark of whichever opening is appropriate to the scale being read to its exact location, whereupon the scale may be read in the appropriate units. The operator of the machine cannot be confused because only one scale is visible at any one time, and the outside of the sleeve 20 is clearly marked as to which scale is being viewed.

The idler spindle 8 has its gearbearing diameter eccentric to the diameter which fits into the the bore 7 so that by rotating the spindle by use of a screwdriver the mesh of the gears may be adjusted.

The assembly described above is simple in construction involving constantly meshing parts; it also provides the facility of being zero set.

What we claim is:

1. An assembly for indicating translational movement of a member selectively in one of two scales, including a sub-assembly adapted for mounting on a fixed structure, a first dial for mounting coaxially with and for rotation about a shaft, a second dial for mounting coaxially with and for rotation about said shaft, said first and second dials both having internal teeth in mesh with an idler pinion carried by said sub-assembly, said first and second dials also having a first and second set of graduations marked respectively on the external surfaces thereof as continuing scales (as herein defined), and an indexable sleeve surrounding both of said scales, said sleeve being rotatable about the axis of said shaft and having two openings therein through which the graduations may be observed and read against a datum line associated with each opening, said openings being positioned so that only one thereof is in view from a given direction at any one time to observe the respective scale, said first dial being connectable for rotation by said shaft and said second dial being rotated by rotation of said first dial through said idler pinion, the number of teeth on the first and second dials being such as to give the desired conversion ratio from one said scale to the other.

2. An assembly as claimed in claim 1, in which said first dial is in screw-threaded connection with a lock nut for zero setting purposes.

3. An assembly as claimed in either claim 1 in which said sleeve has its openings disposed at 180° to each other about said shaft and a detent mechanism is provided to retain the sleeve temporarily in its two locations.

4. An assembly as claimed in claim 3, in which said detent mechanism includes two balls in the sub-assembly which engage selectively in two holes in an end plate integral with the sleeve and resilient means is provided to urge the plate against the balls.

5. An assembly as claimed in claim 4, in which the said resilient means is a Belleville spring.

6. An assembly as claimed in claim 1 for converting movement of said member from Imperial to metric units or vice versa, in which said first dial is provided with 127 gear teeth and said second dial is provided with 125 or 120 gear teeth depending on whether the screw pitch involved is in multiples of 0.100 inches or 0.125 inches, respectively.

7. An assembly as claimed in claim 1 when fitted to a machine tool by operatively connecting said first dial for rotation with a shaft of said machine tool.

* * * * *